United States Patent
Ishihara et al.

(10) Patent No.: US 6,535,256 B1
(45) Date of Patent: *Mar. 18, 2003

(54) COLOR LIQUID CRYSTAL DISPLAY DEVICE

(75) Inventors: Jun Ishihara, Kobe (JP); Kenji Konno, Sakai (JP); Kohtaro Hayashi, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/272,813

(22) Filed: Mar. 19, 1999

(30) Foreign Application Priority Data

Mar. 24, 1998 (JP) .......................................... 10-076097

(51) Int. Cl.[7] ........................ G02F 1/1335; G03B 21/00
(52) U.S. Cl. ............................... 349/5; 349/113; 353/31
(58) Field of Search ........................... 349/8, 5; 353/31, 353/37

(56) References Cited

U.S. PATENT DOCUMENTS 5,028,121 A  *  7/1991  Baur et al. .................. 350/331
5,552,840 A  *  9/1996  Ishii et al. ................... 348/751
5,633,737 A  *  5/1997  Tanaka et al. ................ 349/95
5,798,805 A  *  8/1998  Ooi et al. ..................... 349/10
6,082,861 A  *  7/2000  Dove et al. ................... 353/20
6,116,739 A  *  9/2000  Ishihara et al. ............... 353/31
6,142,633 A  * 11/2000  Takahara et al. ............. 353/20
6,172,723 B1 *  1/2001  Inoue et al. .................. 349/95

FOREIGN PATENT DOCUMENTS

| JP | 8-114780 | | 5/1996 |
| JP | 9-5774 | | 1/1997 |
| JP | 10-10467 | * | 1/1998 |

* cited by examiner

*Primary Examiner*—William L. Sikes
*Assistant Examiner*—Dung Nguyen
(74) *Attorney, Agent, or Firm*—Sidley Austin Brown & Wood LLP

(57) ABSTRACT

A color liquid crystal display device which separates white light in to component colors. The separated colors are modulated by a reflective liquid crystal display. A lens group between the light separator and the reflective liquid crystal display condenses the entering light to each pixel of the liquid crystal display. High brightness and aperture efficiency are achieved by including in the lens group a birefringent material so that a different optical function is performed relative to the entering light fluxes and the modulated light fluxes.

29 Claims, 7 Drawing Sheets

COLOR LIQUID CRYSTAL DISPLAY DEVICE

RELATED APPLICATIONS

This application is based on Japanese Patent Application No. 10-76097, the entire contents of which is incorporated herein by reference.

FIELD OF THE INVENTION

The present invention relates to a projection color liquid crystal display device of a single panel type which accomplishes color display via reflective liquid crystal display elements.

BACKGROUND OF THE INVENTION

Conventional single panel projection-type color liquid crystal display devices are disclosed in Japanese Laid-Open Patent Application Nos. 9-5774 and 8-114780 of a type which separates white light flux into light flux of the three primary colors and irradiates the same liquid crystal display element with the various light fluxes at different angles so as to project light flux modulated by the liquid crystal display element. Since the aforesaid art accomplishes projection with superior efficiency simply because it does not utilize a mosaic color filter and avoids wasting the light flux which does not pass through such a filter, it is suitable for liquid crystal projectors and the like which require a bright image.

Disadvantages arise in the aforesaid art, however, in that transmission type liquid crystals are invariably used which require a circuit linked to the pixel of the liquid crystal, thereby reducing aperture efficiency and reducing the brightness of the corresponding area. The TFT crystal typically used is provided with a transistor circuit for each pixel which blocks the transmission of light flux at that area.

SUMMARY OF THE INVENTION

An object of the present invention is to provide an improved color liquid crystal display device.

Another object of the present invention is to provide a color liquid crystal display element having high aperture efficiency.

Still another object of the present invention is to provide a color liquid crystal display device which makes efficient use of light.

These objects are attained by providing a color liquid crystal display device comprising a separation means for separating white light flux from a white light source into red, green, and blue primary color light and bending the light fluxes in mutually different directions, a liquid crystal display element for modulating the light fluxes which enter from mutually different directions from the separation means to form a color image, and a projection means for projecting the light flux modulated by the liquid crystal display element, wherein the liquid crystal display element is a reflective type liquid crystal which reflects the light flux entering each pixel, and a lens element is disposed medially to the reflective liquid crystal and the separation means to condense the entering light flux to each pixel of the reflective liquid crystal, and wherein a different lens operation is performed relative to the entering light flux and the light flux modulated and reflected by the reflective liquid crystal by combining materials having birefringence characteristics in the lens element.

The invention itself, together with further objects and attendant advantages, will be understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENT

Figure 1:
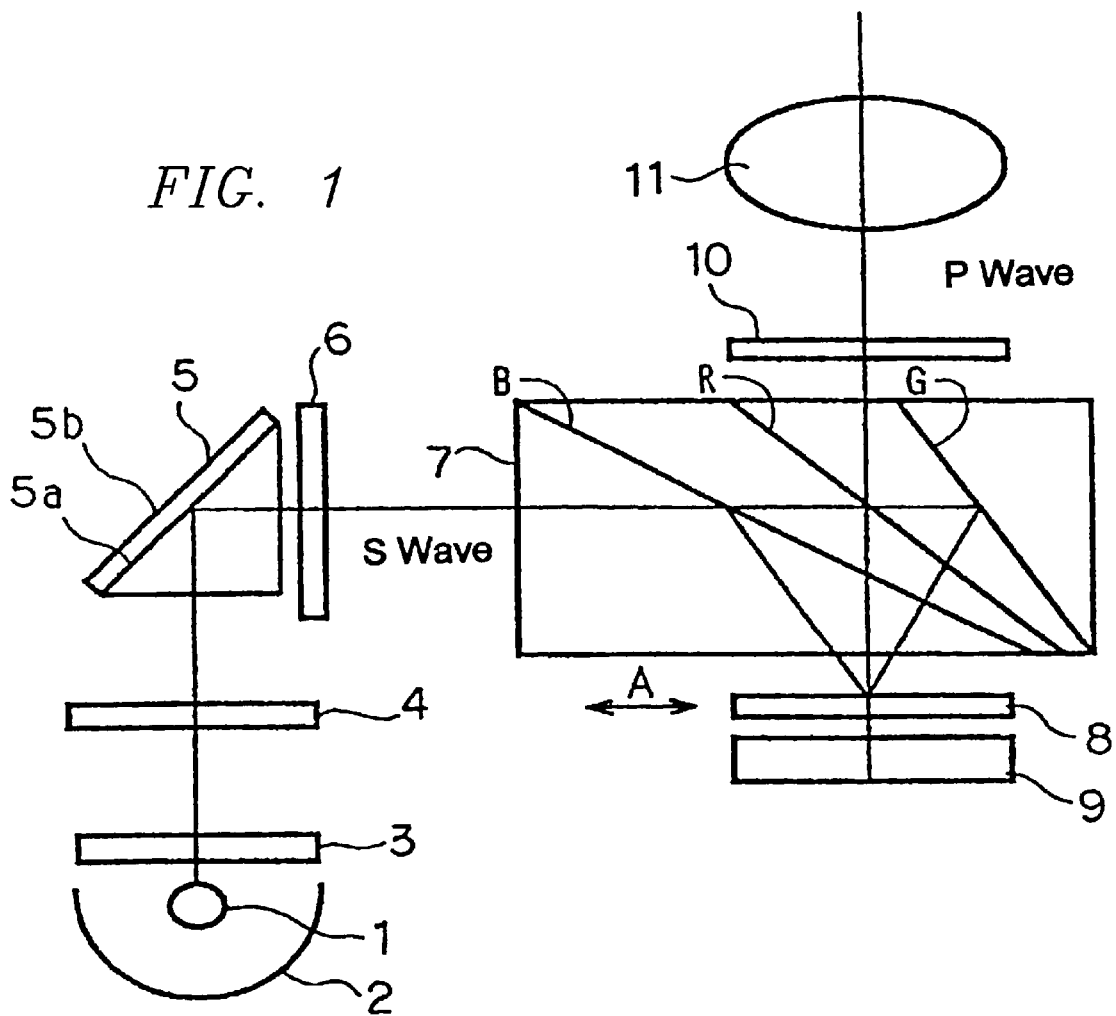
FIG. 1 shows the general construction of an embodiment of the present invention.

The preferred embodiments of the present invention are described hereinafter with reference to the accompanying drawings. FIG. 1 shows the overall construction of an embodiment of the present invention. In the drawing, reference number 1 refers to a white light source, reference number 2 refers to a reflector disposed around the white light source 1 to reflect the light from the white light source 1, reference number 3 refers to a flat UVIR cut-filter disposed above the white light source 1 to block ultraviolet light and infrared light within the light emitted from the white light source 1, reference number 4 refers to a panel-like first lens array disposed above the cut-filter and comprising a plurality of small lenses on the surface of the panel, reference number 5 refers to a triangular polarization conversion prism disposed above the first lens array to convert the light from the white light source 1 to specific polarized light, reference number 6 refers to a panel-like second lens array disposed on the right side of the prism and comprising a plurality of small lenses on the surface of the panel.

The white light source 1 may be, for example, a metal halide lamp. The first lens array 4, the polarization conversion prism 5, and the second lens array 6 form a so-called integrator. This integrator converts the emitted light to a form which appears like light from a plurality of light sources without light source irregularities.

Reference number 7 refers to a block-like dichroic polarization beam splitter disposed on the right side of the second lens array 6 to separate the white light flux emitted from the white light source 1 into red (R), green (G), and blue (B) primary color light fluxes; reference number 8 refers to a flat lens element disposed below the beam splitter 7 to condense the light flux emitted from the dichroic polarization beam splitter 7; and reference number 9 refers to a reflective liquid crystal (reflective-type color liquid crystal) disposed below the flat lens 8 to function as a display element. Reference number 10 refers to a polarization panel disposed above the dichroic polarization beam splitter 7 to regulate the direction of polarization, and reference number 11 refers to a projection optical system disposed above the polarization panel 10 for the display projection of the display information of the reflective liquid crystal 9.

As shown in the drawing, the illumination light (white light flux) comprising a mixture of the direct light from the white light source 1 and the reflected light from the reflector 2 passes through the UVIT cut-filter 3 and becomes purely visible light which passes through the first lens array 4 and enters the polarization conversion prism 5. Within the white light flux, the S-polarized light component is reflected by the surface 5a, and the P-polarized light component is reflected by the surface 5b, and the light flux is emitted toward the second lens array 6. Since the S-polarized light flux component and the P-polarized light flux component form images at different positions on the second lens array 6, only the P-polarized light is set to S-polarized light by a ½ wave plate so that all the light flux becomes S-polarized light. The illumination light that passes through the second lens array 6 enters the dichroic polarization beam splitter 7 as only S-polarized white light flux.

The white light flux of only S-polarized light entering the dichroic polarization beam splitter 7 passes therethrough except for the blue light flux which is reflected by a surface B in the drawing. Then the light flux that passes through the beam splitter 7 continues therethrough except for the red light flux which is reflected by the surface R. Then the light flux that passes through the beam splitter 7 continues therethrough except for the green light flux which is reflected by the surface G. The light flux of the separated three primary colors pass through the lens element 8 and condense on each pixel of the reflective liquid crystal 9. The S-polarized light of the entering light flux is converted to P-polarized light and reflected when the pixels used for the screen display of the reflective liquid crystal 9 are turned ON at a given moment, and the S-polarized light of the entering light flux is reflected directly when the pixels are unused and turned OFF.

The light flux reflected by the reflective liquid crystal 9 again passes through the lens element 8 and enters the dichroic polarization beam splitter 7, and only the light flux of the P-polarized light, i.e., the light flux reflected by the pixels of the reflective liquid crystal which are turned ON, pass through and is adjusted completely to P-polarized light by passing through the polarization plate, and enters the projection optical system 11 to project an image. As described above, the light flux entering the dichroic polarization beam splitter 7 from the so-called integrator is desirably arranged so that the polarization direction is the direction of the S-polarized light.

A three-facet BRG splitter must be provided on the dichroic polarization beam splitter 7 as shown in the drawing. This splitter accomplishes color separation by separating the illumination light into red (R), green (G), and blue (B) colors, suppresses the loss of light, and effectively directs each color to the pixels of the reflective liquid crystal 9. The point of this construction is to have a different entrance angle to the lens element 8 for each color. This arrangement is described in detail later.

Although the order of reflection of the colors in the dichroic polarization beam splitter 7 is listed as B-R-G from the entrance side (illumination side) in the present embodiment, the present invention is not limited to this arrangement. That is, the order may be, from the entrance side, R-G-B, R-B-G, or B-G-R to attain similar effect. Since the metal halide lamp used as the material for the white light source 1 produces a low intensity red color, the order of reflection of the red (R) is desirably directly in the center as in the present embodiment so as to not produce vignetting caused at the lens edge of the projection optical system 11.

Each R, G, B facet is provided with a coating (dichroic coating) which functions as a polarization beam splitter, but since the wavelength band of the light flux is relatively broad when the green (G) S-polarized light is reflected, positioning the G facet first on the entrance side reflects part of the red (R) and blue (B) due to the specification for setting the wavelength band of reflection, and therefore this arrangement is undesirable.

The arrangement of the reflective liquid crystal 9 as a panel desirably provides the short side as indicated by the arrow A in FIG. 1, and the long side in the direction perpendicular to the drawing sheet surface. In this way, the surface area of the dichroic polarization beam splitter can be reduced. The projection optical system 11 can also be rendered compact due to the short lens back from the reflective liquid crystal 9 to the projection optical system 11. The polarization plate 10 through which the P-polarization light passes is theoretically unnecessary, but its use improves the contrast of the projected image.

Figure 2:
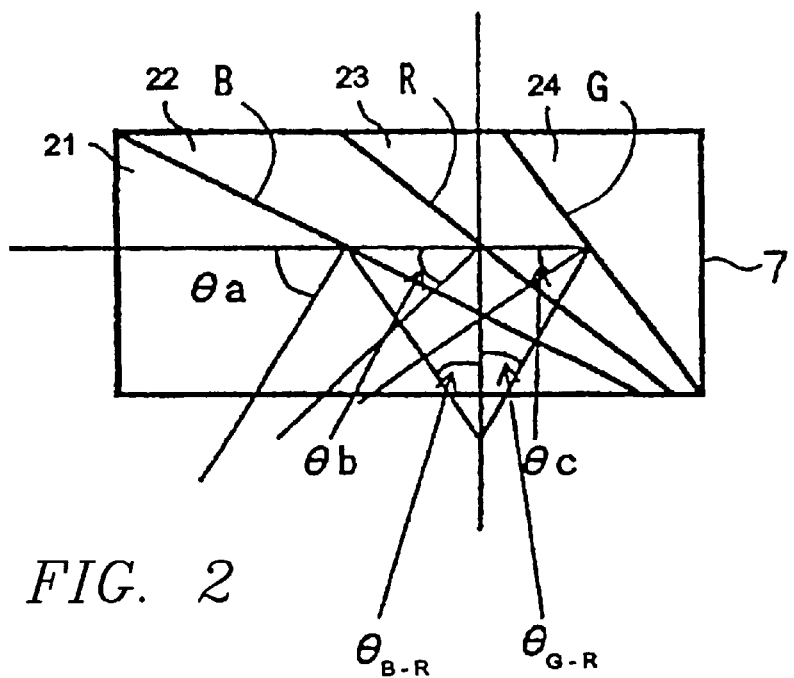
FIG. 2 shows the construction of a dichroic polarization beam splitter.

FIG. 2 shows the construction of the of the dichroic polarization beam splitter 7. As shown in the drawing, the dichroic polarization beam splitter 7 comprised four cemented glass prisms 21 through 24. A coating surface is formed between the glass prisms 21 and 22, between glass prisms 22 and 23, and between glass prisms 23 and 24, and these coatings of each surface B, R, and G accomplish color separation by reflecting the light flux of the S-polarized light of each color.

In the drawing, the entrance angle of the illumination light entering from the left side of the drawing is respectively represented as $\theta a$, $\theta b$, and $\theta c$ in the coating surfaces B, R, and G formed between the glass prisms 21 and 22, between glass prisms 22 and 23, and between glass prisms 23 and 24. The angle of intersection of the reflected light in surfaces B and R is designated $\theta B\text{-}R$, and the angle of intersection of reflected light in surfaces G and R is designated $\theta G\text{-}R$. These angles become the entrance angles of the reflected light at surface B and surface C to the lens element 8 (i.e., the reflective liquid crystal 9 which functions as the display element). The entrance angle of the reflected light of surface R to the lens element 8 is approximately 0° relative to a perpendicular to the surface of the reflective liquid crystal 9.

In viewing the relationship among the angles in the present embodiment, when the entrance angles $\theta B\text{-}R$ and $\theta G\text{-}R$ to the lens element 8 are set as shown in Table 1 below, the entrance angle to each coating surface becomes $\theta a$, $\theta b$, and $\theta c$, respectively. When the entrance angles $\theta B\text{-}R$ and $\theta G\text{-}R$ to the lens element 8 are greater than the aforesaid angles, it becomes difficult to condense the light flux reflected by the reflecting liquid crystal 9, and the lens diameter of the projection optical system 11 must be increased. Conversely, when the aforesaid angles are too small, sufficient color separation cannot be obtained. Therefore, the optimum range of the entrance angle to the lens element 8 (display element) is shown below.

$5° \leq θB\text{-}R \leq 20°$
$5° \leq θG\text{-}R \leq 20°$

TABLE 1

| θB-R | θG-R | θa | θb | θc |
|---|---|---|---|---|
| 5 | 5 | 47.5 | 45 | 42.5 |
| 10 | 10 | 50 | 45 | 40 |
| 15 | 13.25 | 52.5 | 45 | 38.4 |

Figure 3:
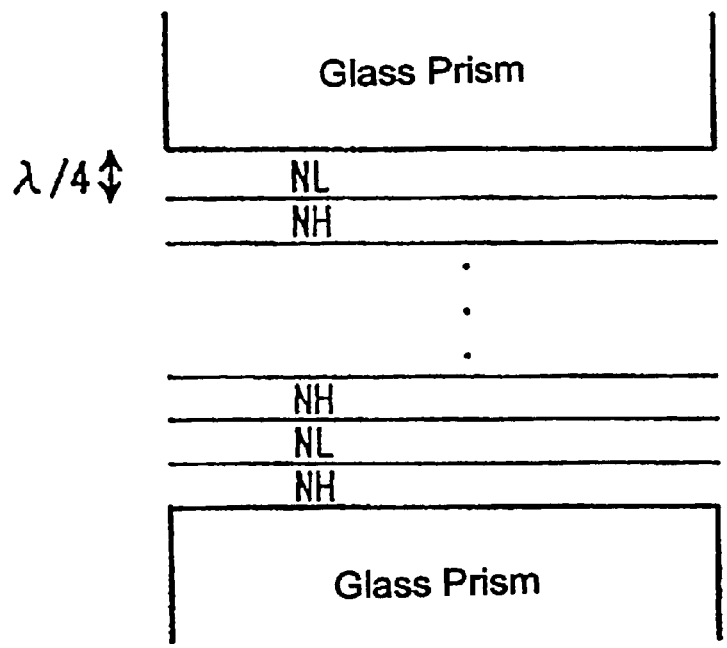
FIG. 3 illustrates the thin film structure of the glass prism coating.

The thin film structure of the coating surfaces respectively formed between the glass prisms 21 and 22, between glass prisms 22 and 23, and the glass prisms 22 and 24 are shown in FIG. 3. The S-polarized light is effectively reflected at the entrance angles θa, θb, and θc to the coating surfaces of Table 1, and the P-polarized light passes through the thin film structure shown in Table 2 (i.e., the thin film structure and angle of reflection of the S-polarized light). The refractive index of the glass is set at 1.62 in this instance. Each coating surface is produced by superimposing a high refractive index material (NH) and a low refractive index material NL) on the same surface relative to the angle θ, as shown in FIG. 3.

TABLE 2

| | Refractive Index | | Material | |
|---|---|---|---|---|
| θ | NH | NL | NH | NL |
| 38.4 | 1.465 | 1.385 | $SiO_2$ | $MgF_2$ |
| 40 | 1.62 | 1.385 | $Al_2O_3$ | $MgF_2$ |
| 45 | 2.05 | 1.385 | $ZrO_2$ | $MgF_2$ |
| 50 | 2.3 | 1.465 | $TiO_2$ | $SiO_2$ |
| 51.25 | 2.05 | 1.62 | $ZrO_2$ | $Al_2O_3$ |
| 52.5 | 2.1 | 1.62 | $ZrTiO_4$ | $Al_2O_3$ |

In the drawing, λ represents the design wavelength, and a wavelength may be suitably selected at 400 to 500 nm in the blue (B) region, at 500 to 600 nm in the green (G) region, and at 600 to 700 in the red (R) region, and the lamination may have a thickness of ¼ wavelength. When the entrance angles θa, θb, and θc match the values of θ in Table 2, excellent polarized light separation is 10 obtained. Furthermore, the lamination typically has approximately 20 layers to accomplish excellent polarized light separation and color separation.

Figure 4:
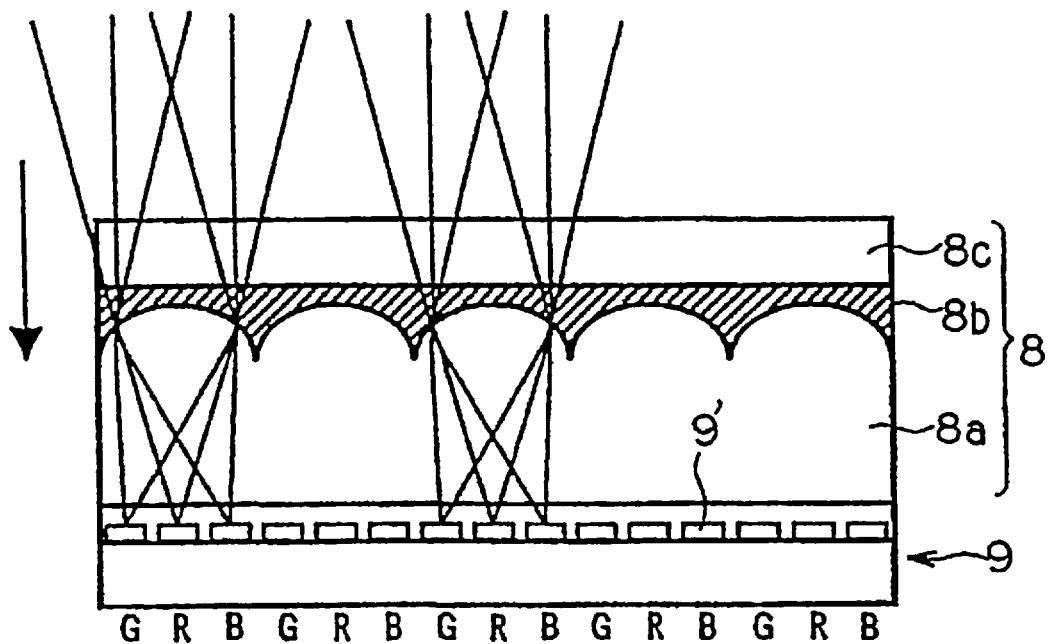
FIG. 4 shows an example of the structure of a lens element and a reflective liquid crystal.

FIG. 4 shows an example of the construction of the lens element 8 and the reflective liquid crystal 9 with the illumination light entering (in FIGS. 4 through 9, the short side is the direction along the drawing sheet surface, and the long side is in the direction perpendicular to the drawing sheet surface). As shown in the drawings, a panel-like micro lens array 8a comprising a plurality of small lenses on the order of several microns arranged on the surface is provided directly anterior to the reflective liquid crystal 9 as a structural element of the lens element 8, and on this surface is provided a material 8b having birefringence characteristics and different refractive index depending on the direction of the polarized light passing therethrough. Over the material 8b is provided a transparent panel 8c formed of protective glass or the like. The micro lens array 8a may be a lenticular lens as described later.

When illumination light which has been separated into the three primary colors enters the lens element 8 from the direction indicated by the arrow in the drawing, the illumination light is S-polarized light, and the material 8b which possesses birefringence characteristics functions as a material of different refractive index to the refractive index of the micro lens array 8a relative to the S-polarized light as indicated by the diagonal lines. The operation of the materials 8a and 8b condenses the light flux on the pixel 9' of the reflective liquid crystal 9 arranged so as to reflect the desired colors R, G, B. This arrangement avoids loss of light, and produces a bright image.

The material having the aforesaid birefringence characteristics is optimally a liquid crystal, the orientation direction of the liquid crystal being controlled by an orientation process. Furthermore, a UV-curable liquid crystal material may be used such that the liquid crystal is irradiated by ultraviolet light and solidified at the moment the desired orientation is attained electrically or by an orientation process.

Figure 5A:
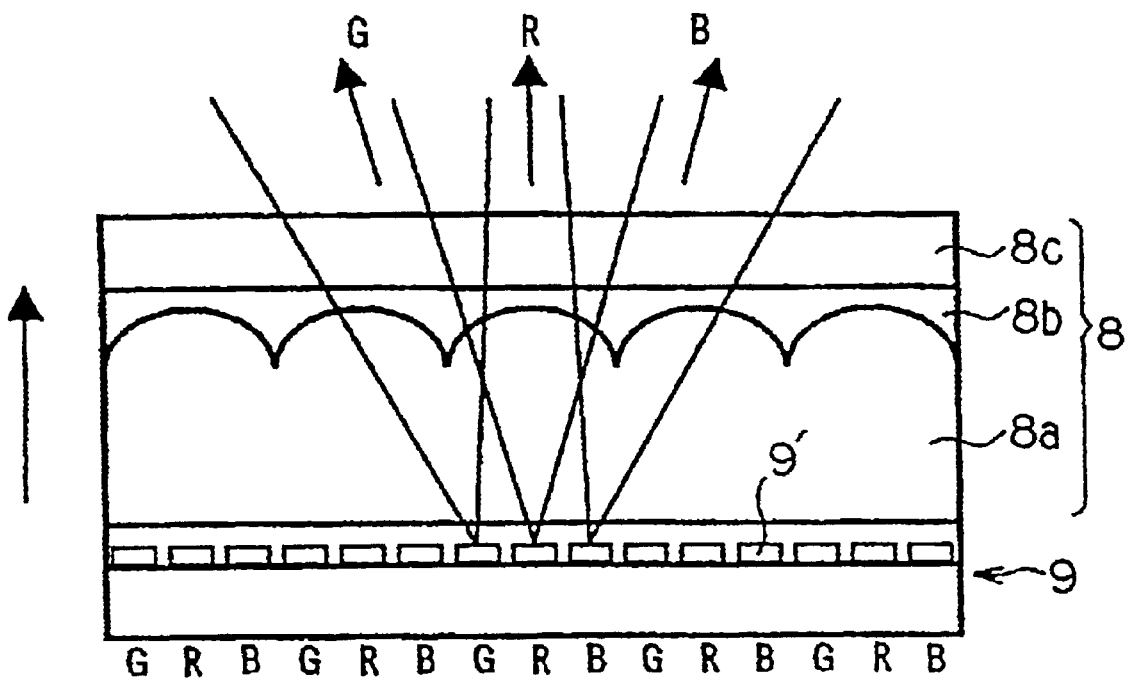
FIGS. 5(a) and 5(b) show the emission of illumination light reflected by the reflective liquid crystal.
Figure 5B:
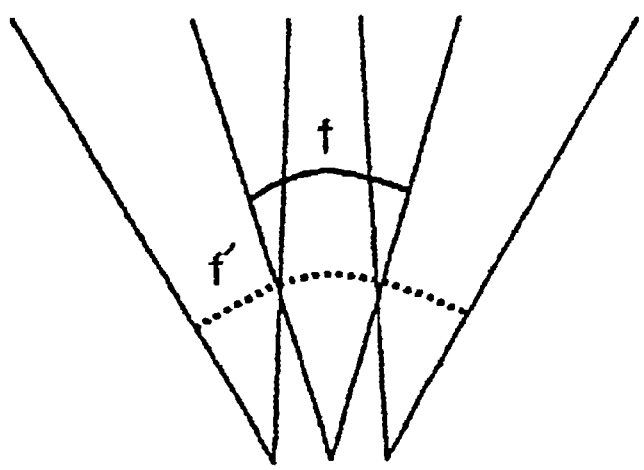

FIGS. 5(a) and 5(b) are the same construction as FIG. 4, but show the emission of the illumination light reflected by the reflective liquid crystal 9. As shown in FIG. 5(a), when the light flux of each color R, G, B is emitted in the arrow direction from the respective pixels 9' of the reflective liquid crystal 9, the light flux used for the image is converted from S-polarized light to P-polarized light by the reflective liquid crystal 9, and the material 8b possessing birefringence characteristics functions as material having the same refractive index as the refractive index possessed by the micro lens array 8a relative to the P-polarized light. At this time, the influence of the micro lens array 8a on the emitted light flux does not disturb the image since the lens element 8 is equivalent to a material having the same refractive index and homogenous throughout.

In the present embodiment, when only the reflected light flux is used as in FIG. 5(b), the F number of the reflected light flux R, G, B, is indicated by the angle f represented by the solid line in the drawing (as the F number of R is representative), and the direction of reflection of the main light rays is different for R, G, B regardless of whether or not the values are identical, such that the emission has a broader F number as indicated by the angle f' represented by the dotted line in the drawing. Since the G and B light fluxes are emitted broadly on bilateral sides of the R light flux, a correction is effected by necessarily reducing the F number (i.e., brightening the optical system) of the projection optical system 11.

Figure 6:
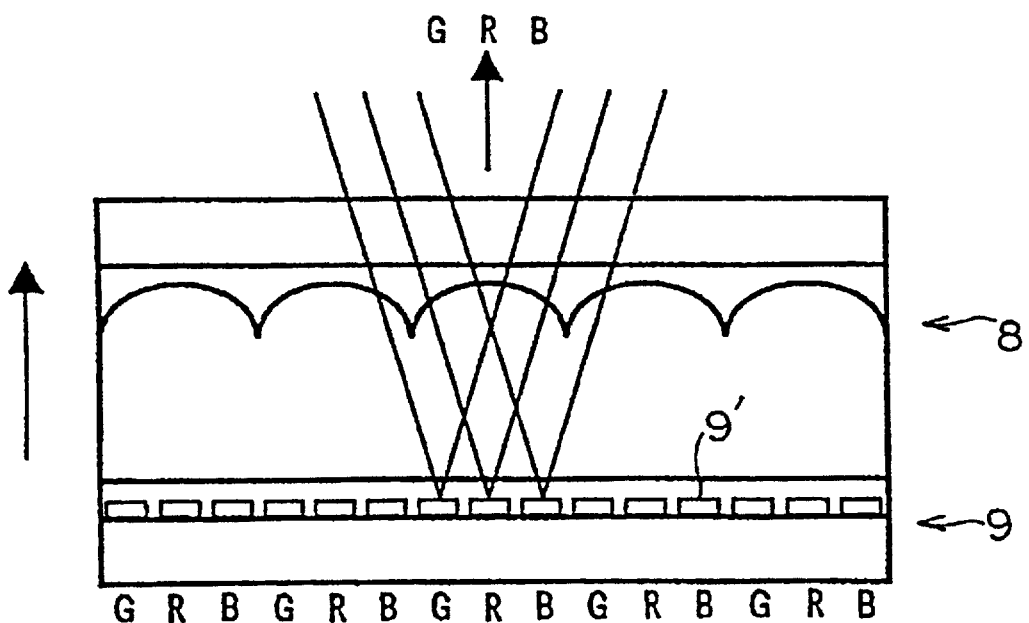
FIG. 6 shows the emission of illumination light when the reflective liquid crystal is provided with a DOE.

As shown in FIG. 6, the projection optical system 11 can be made compact by arrangement of a DOE (diffraction grating) not shown in the drawing at the reflecting part to reflect G and B within the pixel 9' of the reflective liquid crystal 9, so that direction of the main light rays of G and B are in the same direction as R, as indicated by the by the arrow. The reflection of R within the pixel 9' is unhindered even when the DOE is omitted.

Figure 7A:
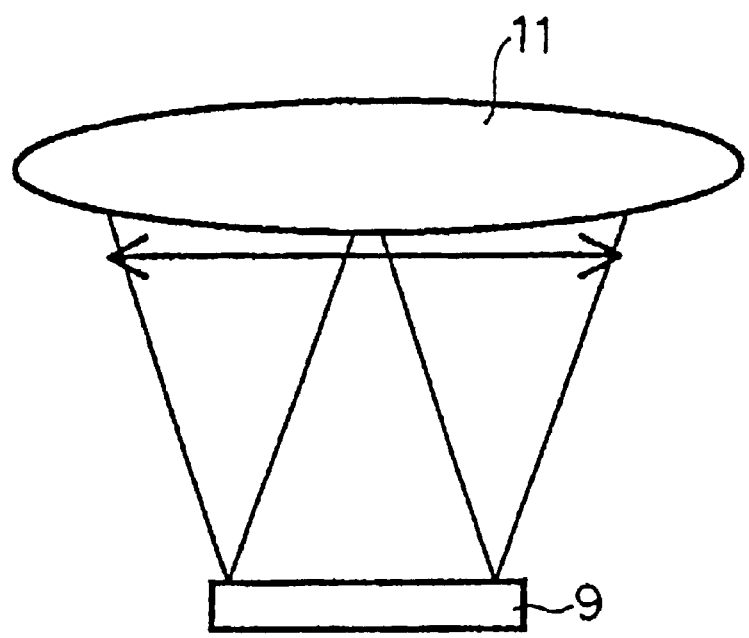
FIGS. 7(a) and 7(b) illustrate the function of the lens coating of the reflective liquid crystal.
Figure 7B:
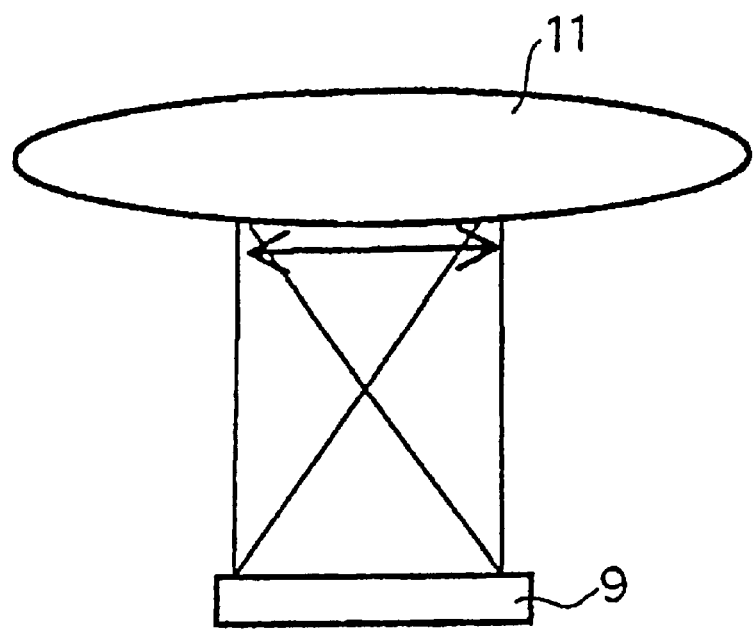

The DOE functions as a condenser lens, and light diffraction is stronger toward the edge of the screen of the reflective liquid crystal 9 due to the change in shape of the DOE at each pixel. FIGS. 7(a)–7(b) illustrate the function of the condenser lens. As shown in FIG. 7(a), when the reflective liquid crystal 9 does not function as a condenser lens, the reflected light flux is considerably wide when it attains the projection optical system 11 as indicated by the arrow, such that the lens diameter of the projection optical system 11 must be increased a certain degree to condense the light.

Conversely, as shown in FIG. 7(b), when the reflective liquid crystal 9 does function as a condenser lens, the widening of the reflected light flux is suppressed when it attains the projection optical system 11 as indicated by the arrow, and the lens diameter of the projection optical system 11 which condenser this light flux can be made smaller and more compact.

Figure 8:
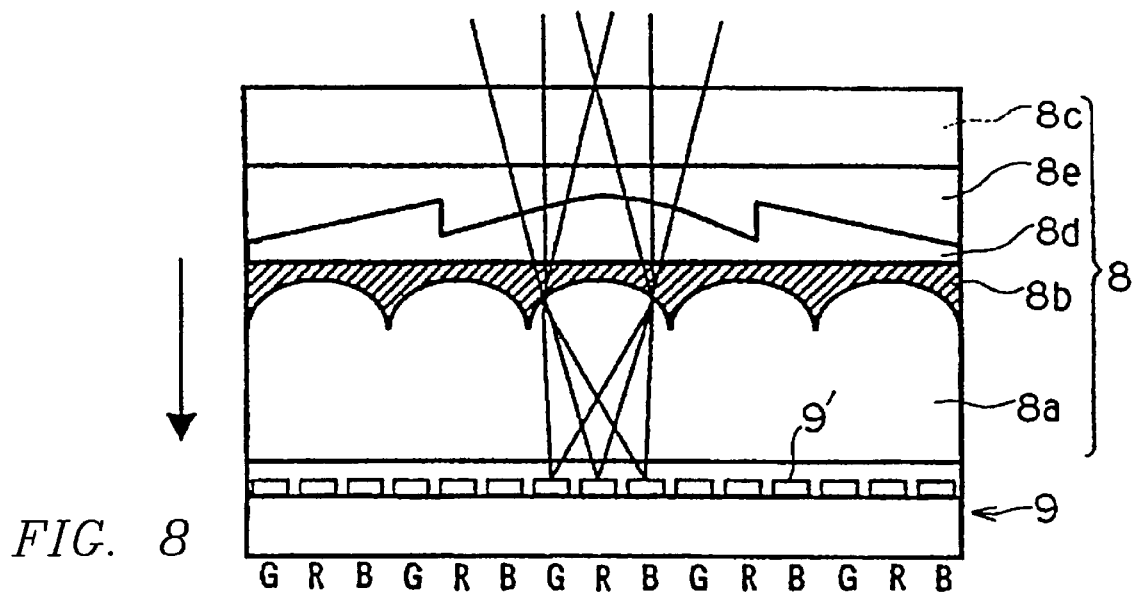
FIG. 8 shows another example of a structure of the lens element and the reflective liquid crystal.

FIG. 8 shows another example of the construction of the lens element 8 and the reflective liquid crystal 9, and the state of entering illumination light. As shown in the drawings, a panel-like micro lens array 8a comprising a plurality of small lenses on the order of several microns arranged on the surface is provided directly anterior to the reflective liquid crystal 9 as a structural element of the lens element 8, and on this surface is provided a material 8b having birefringence characteristics and different refractive index depending on the direction of the polarized light passing therethrough.

Above the material 8b is provided a Fresnel lens 8d, and over the lens 8d is provided a material 8e having separate birefringence characteristics and different refractive index depending on the direction of the polarized light passing therethrough. Over the material 8e is provided a transparent panel 8c formed of protective glass or the like. The micro lens array 8a may be a lenticular lens described later.

When the illumination light separated into the three primary colors enters the lens element 8 from the direction indicated by the arrow in the drawing, the material 8e which possesses separate birefrinqence characteristics functions as a material having the same refractive index as the refractive index of the Fresnel lens 8d relative to the S-polarized light comprising the illumination light, so as to be equivalent to a homogenous material. The material 8b which possesses birefringence characteristics functions as a material having a refractive index different than the refractive index of the micro lens array 8a relative to the S-polarized light, as indicated by the diagonal lines in the drawing. The materials 8a and 8b function jointly to condense the light flux on the respective pixels 9' of the reflective liquid crystal 9 arranged to reflect a desired color R, G, B. In this way, there is no loss of light and a bright image is obtained.

Figure 9A:
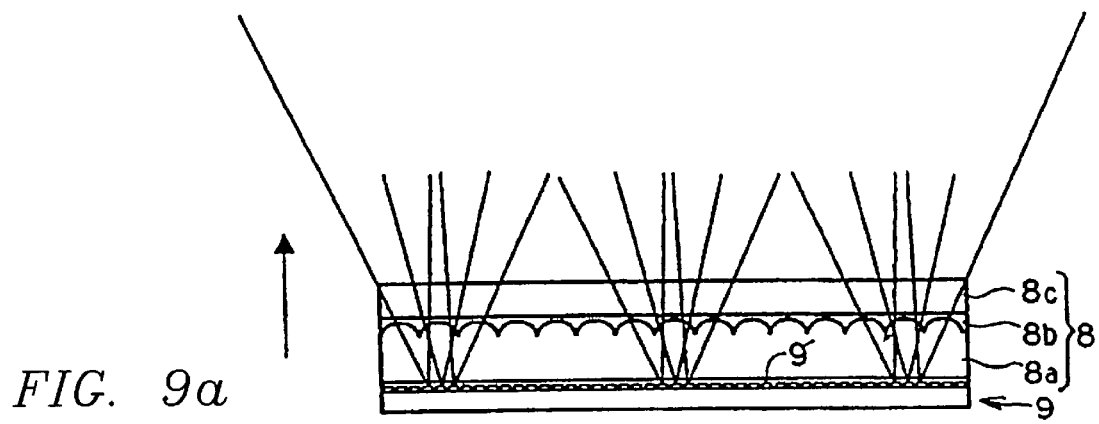
FIG. 9(a) illustrates the absence of a Fresnel lens in the state of illumination light emission.
Figure 9B:
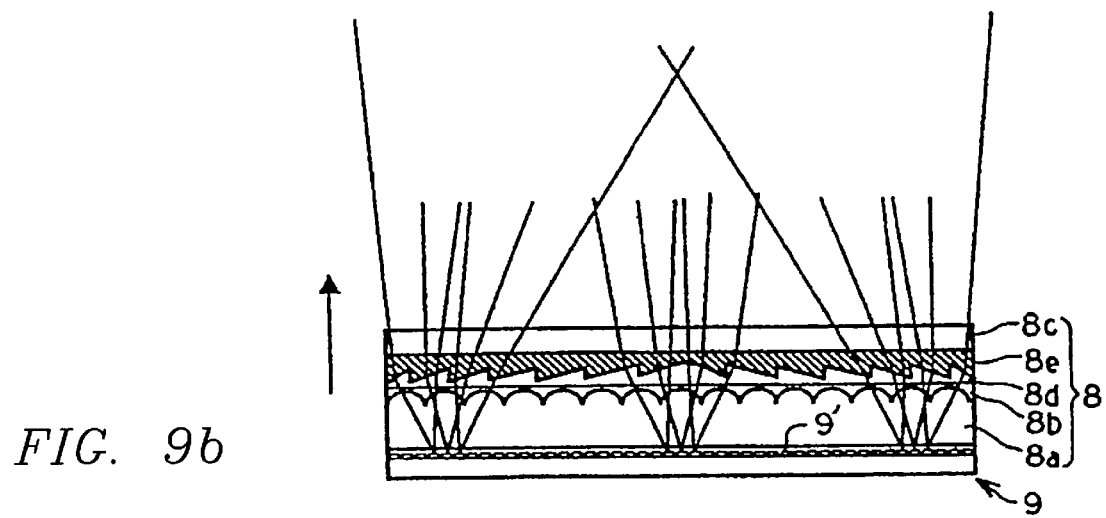
FIG. 9(b) illustrates the presence of a Fresnel lens in the state of illumination light emission.

FIGS. 9(a)–9(b) show the emission of the illumination light reflected by the reflective liquid crystal 9 across the entire length of the short edge. FIG. 9(a) illustrates the situation in the absence of a Fresnel lens under the same conditions shown in FIG. 5 with the entire shape shown. FIG. 9(b) illustrates the situation when a Fresnel lens is used.

As shown in FIG. 9(b), when light flux of each color R, G., B (not shown in the drawing) is emitted in the arrow direction from the respective pixels 9' of the reflective liquid crystal 9, the light flux used for the image is converted from S-polarized light to P-polarized light by the reflective liquid crystal 9, and the material 8b having birefringence characteristics functions as a material having the same refractive index as the refractive index of the micro lens array 8a relative to the P-polarized light. At this time, the emitted light flux does not disturb the image due to the influence of the micro lens array 8a similar to the situation of FIG. 5.

The material 8e having separate birefringence characteristics functions as a material having a refractive index different from the refractive index of the Fresnel lens 8d relative to the P-polarized light. The materials 8d and 8e function jointly as a condenser lens to suppress the broadening of the emitted light flux which attains the projection optical system, 11 not shown in the drawing, such that the size of the lens of the projection optical system 11 which condenses the light flux may be reduced and the projection system rendered more compact.

Figure 10A:
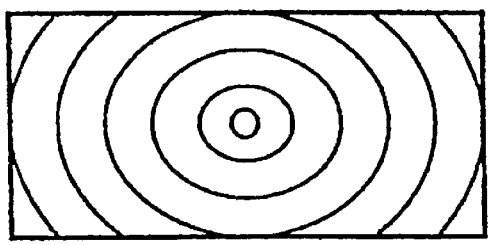
FIGS. 10(a) and 10(b) show the shape of the Fresnel lens.
Figure 10B:
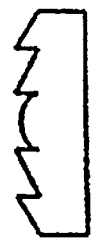
Figure 11A:
FIG. 11(a) shows a front view of a Fresnel lens with stripes in the short side direction.
Figure 11B:
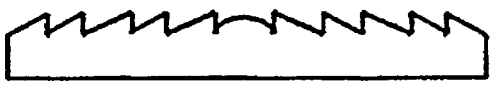
FIG. 11(b) shows a front vertical section view of a Fresnel lens with stripes in the short side direction.

FIGS. 10(a)–10(b) show the shape of the Fresnel lens 8d; FIG. 10(a) is a front view and FIG. 10(b) is a vertical section view from the side. The surface of the Fresnel lens normally forms circular bands about the center of the screen, and when used in the present embodiment, the main rays of reflected light flux passing through the center of the lens are not necessarily parallel to the optical axis of the projection optical system 11, but this does not influence the quality of the image. Although not directly related to the present invention, when a Fresnel lens is used which has stripes only in the direction of the short side as shown in the front view FIG. 11(a) and front vertical section view of FIG. 11(b), the suppression of the broadening light flux is suppressed in the direction of the long edge.

Figure 12A:
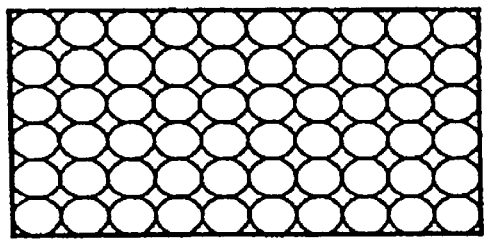
FIG. 12(a) shows a front view of the form of a micro lens array.
Figure 12B:
FIG. 12(b) shows a vertical section view from the side of the form of a micro lens array.
Figure 13A:
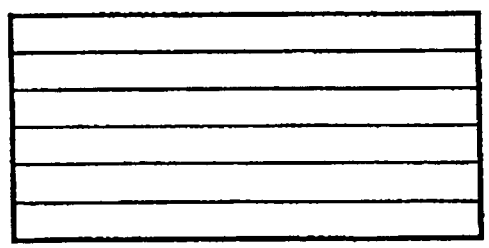
FIG. 13(a) shows a front view of the form of a lenticular lens.
Figure 13B:
FIG. 13(b) shows a vertical section view from the side of the form of a lenticular lens.

FIGS. 12(a)–12(b) illustrate the shape of the micro lens array 8a; FIG. 12(a) is a front view, and FIG. 12(b) is a vertical section view from the side. The micro lens array normally is a panel having an array of a plurality of small lenses on the order of several microns on the surface thereof as shown in the drawing, but in the present embodiment the micro lens array may be a stripe-like lenticular lens having a unidirectional color separation effect as shown in the front view of FIG. 13(a) and the vertical section view from the side shown in FIG. 13(b). Needless to say, in this case the direction of color separation matches the direction of the broadening of the light flux via color separation. According to the previously described embodiment, the present invention provides a color liquid crystal display device of excellent efficiency by using a bright reflective liquid crystal to increase aperture efficiency, and using a material having birefringence characteristics in the lens element acting only on the entering light flux or exiting light flux, and arranging the reflective liquid crystal to produce these efficiencies.

The present invention further provides a bright image because light flux reflected by the reflective liquid crystal (emission light flux) is directed to the projection optical system without disrupting the light by not using a lens action.

Since a lenticular lens is relatively simple to construct compared to a micro lens array, the same functionality can be attained at lower cost.

By constructing the Fresnel lens so as to not act upon the entering light flux but to condense the exiting light flux, the width of the exiting light flux can be restricted and the projection optical system made more compact while containing cost.

The birefringence index ($\Delta n$) of the liquid crystal is about 0.2, which is a larger birefringence than other materials having birefringence characteristics, thereby allowing the curvature of the lens to be reduced, while improving functionality.

By using a polarization beam splitter the light flux can be effectively used to maintain brightness.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A color image projection device comprising:
   a light source for generating substantially white light;
   a separation device for separating white light flux from the white light source into red, green, and blue primary color light fluxes and for deflecting the separated color light fluxes in different directions;

a reflective liquid crystal display element, disposed to receive all of said separated color light fluxes from said separation device, for modulating the separated color light fluxes to form a color image;

a lens unit disposed between the reflective liquid crystal display and the separation device to condense the separated color light fluxes from the separation device onto a plurality of pixels of the reflective liquid crystal display, said lens unit including a birefringent element; and a projecting device for projecting the separated color light fluxes modulated by the reflective liquid crystal display element.

2. A color image projection device in accordance with claim 1, wherein said lens unit includes at least two birefringent elements.

3. A color image projection device in accordance with claim 1, wherein said lens unit includes a micro lens array.

4. A color image projection device comprising:

a polychromatic light source;

a light separation device for separating a polychromatic light from said light source into a plurality of separated light beams, each separated light beam being substantially monochromatic;

a reflective display device for receiving all of said separated light beams and for selectively reflecting said separated light beams to form a polychromatic image; and a concentrating device disposed between said light separation device and said reflective display element for concentrating said separated light beams incoming from said light separation device onto said reflective display element.

5. A color image projection device in accordance with claim 4, wherein said concentrating device includes a birefringent element.

6. A color image projection device in accordance with claim 5, wherein said reflective display device includes a plurality of pixels, a portion of said plurality of pixels corresponding to each of said separated light beams from said light separation device.

7. A color image projection device in accordance with claim 6, wherein said concentrating device is adapted to deflect each of said separated light beams from said light separation device to said portion of said plurality of pixels corresponding thereto.

8. A color image projection device in accordance with claim 7, wherein said concentrating device includes a birefringent element, said concentrating device being adapted to deflect each of said separated light beams incoming from said light separation device, and said concentrating device being adapted to not deflect said separated light beams reflected by said reflective display device.

9. A color image projection device in accordance with claim 4, wherein said separated light beams incoming from said light separation device have a linear polarization in a first direction, said first direction being substantially orthogonal to a second direction of linear polarization of said separated light reflected from said reflective display device.

10. A color image projection device in accordance with claim 9, wherein said concentrating device includes a birefringent element so that said separated light beams incoming from said light separation device having a linear polarization in said first direction are refracted to a first extent and said separated light reflected from said reflective display device having a linear polarization in said second direction are refracted to a second extent.

11. A color image projection device in accordance with claim 9, wherein said reflective display device is a reflective-type liquid crystal display assembly, said reflective-type liquid crystal display assembly selectively reflecting said separated light beams incident thereon from said light separation device, said reflective-type liquid crystal display assembly operating to rotate a polarization direction of said separated light beams incident thereon from said first direction to said second direction.

12. A color image projection device in accordance with claim 4, wherein said polychromatic light source includes a polarizing device so that said polychromatic light outputted from said light source is substantially linearly polarized in a first direction.

13. A color image projection device in accordance with claim 12, wherein said light separation device is a dicroic beam splitter.

14. A color image projection device in accordance with claim 13, wherein said concentrating device includes a refractive element and a birefringent element, an axis of said birefringent element being optically oriented relative to said light source so that a first refractive index of said birefringent element, consistent with said first direction, is different than a refractive index of said refractive element, and a second refractive index of said birefringent element, consistent with a second direction orthogonal to said first direction, is substantially equivalent to said refractive index of said refractive element.

15. A color image projection device in accordance with claim 13, further comprising:

a projection optical system for receiving said separated light beams reflected by said reflective display device and-for forming a projected image therefrom; and a second polarizing device disposed between said reflective display device and said projection optical system for polarizing said separated light beams reflected by said reflective display device.

16. A color image projection device in accordance with claim 12, wherein said concentrating device includes a refractive element and a birefringent element, each of said refractive element and said birefringent elements having first and second opposing major surfaces, said first major surface of said refractive element being bonded to said first major surface of said birefringent element, said second major surface of said refractive element being substantially parallel to said second major surface of said birefringent element, and an axis of said birefringent element being optically oriented relative to said light source so that an optical power of said combination of said refractive element and said birefringent element is substantially zero for a light beam having a polarization direction orthogonal to said first direction.

17. A color image projection device in accordance with claim 16, wherein said refractive element is a micro lens array.

18. A color image projection device in accordance with claim 16, wherein said refractive element is a lenticular micro lens array.

19. A color image projection device in accordance with claim 12, wherein said concentrating device includes two optical assemblies;

a first optical assembly including a micro lens array element and a first birefringent element which are bonded together, a second sub-assembly including a fresnel lens element and a second birefringent element which are bonded together;

an index of refraction of a material comprising said micro lens array being substantially equal to an index of refraction of said first birefringent element along a first orientation thereof, said first optical assembly being oriented relative to said light source so that an optical power of said first optical assembly is substantially zero for a light beam incident thereon having a polarization direction in said first direction; and an index of refraction of a material comprising said fresnel lens being substantially equal to an index of refraction of said second birefringent element along a first orientation thereof, said second optical assembly being oriented relative to said light source device so that an optical power of said second optical assembly is substantially zero for a light beam incident thereon having a polarization direction orthogonal to said first direction.

20. A color image projection device which comprises:

a light source for generating substantially white light having a linear polarization in a first direction;

a separator for receiving said white light from said light source and separating said white light into a plurality of primary color light beams;

a concentrator for receiving said primary color light beams from said separator and for concentrating said primary color light beams, said concentrator including at least one birefringent element;

a reflective display device, including a plurality of pixels, for receiving said concentrated primary color light beams and for selectively reflecting said concentrated primary color light beams in accordance with an image to be formed; and a projecting device for projecting said primary color light beams reflected by said reflective display device to form an image.

21. A color image projection device in accordance with claim 20, wherein said concentrator is optically disposed between said separator and said reflective display device and said concentrator is also optically disposed between said reflective display device and said projecting device;

said reflective display is adapted to rotate a polarization of said concentrated primary color light beams from said first direction to a second direction substantially orthogonal to said first direction; and wherein said concentrator is adapted to concentrate light beams having a polarization direction in said first direction and said concentrator is adapted to not concentrate light beams having a polarization direction in said second direction.

22. A color image projection device in accordance with claim 21, wherein said concentrator includes at least two birefringent elements.

23. A color image projection device in accordance with claim 21, wherein said concentrator includes a micro lens array.

24. A color image projection device in accordance with claim 21, wherein said concentrator includes a lenticular micro lens array.

25. A color image projection device in accordance with claim 21, further comprising a polarizing element optically disposed between said concentrator and said projecting device.

26. A lens device adapted for use with a projector, and to condense separated color light fluxes from a separation device onto a plurality of pixels on a reflective liquid crystal display, said lens device comprising:

a micro-lens array having a plurality of lenses, arranged in a panel-like shape; and a first material having birefringence characteristics, said first material attached to said micro-lens array, said first material located between said separation device and said micro-lens array.

27. A lens device as claimed in claim 26, wherein said micro-lens array is a lenticular lens.

28. A lens device as claimed in claim 26, further comprising a transparent protective panel located over said first material having birefringence characteristics.

29. A lens device as claimed in claim 28, further comprising a Fresnel lens and a second material having separate birefringence characteristics;

wherein said Fresnel lens is located between said first material having birefringence characteristics and said transparent protective panel and said second material having separate birefringence characteristics is located between said Fresnel lens and said transparent protective panel.

* * * * *